United States Patent
You et al.

(10) Patent No.: US 11,894,510 B2
(45) Date of Patent: *Feb. 6, 2024

(54) BATTERY PACK AND VEHICLE

(71) Applicant: CONTEMPORARY AMPEREX TECHNOLOGY CO., LIMITED, Ningde (CN)

(72) Inventors: Kaijie You, Ningde (CN); Yongguang Wang, Ningde (CN); Yu Tang, Ningde (CN); Weilong Lin, Ningde (CN); Jun Ma, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/080,082

(22) Filed: Dec. 13, 2022

(65) Prior Publication Data

US 2023/0108623 A1    Apr. 6, 2023

Related U.S. Application Data

(63) Continuation of application No. 16/856,883, filed on Apr. 23, 2020, now Pat. No. 11,563,248.

(30) Foreign Application Priority Data

Jun. 27, 2019   (CN) .......................... 201910565257.4

(51) Int. Cl.
*H01M 50/249*    (2021.01)
*H01M 10/04*    (2006.01)
(Continued)

(52) U.S. Cl.
CPC ... *H01M 10/0413* (2013.01); *H01M 10/0431* (2013.01); *H01M 50/20* (2021.01);
(Continued)

(58) Field of Classification Search
CPC ......... H01M 10/0413; H01M 10/0431; H01M 50/249; H01M 50/543; H01M 50/20;
(Continued)

(56) References Cited

U.S. PATENT DOCUMENTS 8,795,867 B2    8/2014  Kim
9,876,260 B2    1/2018  Kim
(Continued)

FOREIGN PATENT DOCUMENTS

CN    102104122 A    6/2011
CN    202178305 U    3/2012
(Continued)

OTHER PUBLICATIONS

Extended European Search Report of EP application No. 20166062.8, dated Dec. 22, 2020, 5 pages.
(Continued)

*Primary Examiner* — Jane J Rhee
(74) *Attorney, Agent, or Firm* — Ladas & Parry LLP

(57) ABSTRACT

A battery pack and a vehicle, wherein the battery pack includes a box assembly, a battery unit, a constraint component and an outer cover, the box assembly includes a box body and a fixed beam, the fixed beam is fixed in the box body; the battery unit is arranged in the box body; the constraint component covers the battery unit and is fixed with the fixed beam; and the outer cover is arranged on one side of the constraint component away from the box body to seal an open end of the box body.

18 Claims, 5 Drawing Sheets

(51) Int. Cl.
  *H01M 50/271* (2021.01)
  *H01M 50/543* (2021.01)
  *H01M 50/20* (2021.01)
  *H01M 50/55* (2021.01)
  *H01M 50/553* (2021.01)
  *H01M 50/209* (2021.01)

(52) U.S. Cl.
  CPC ....... *H01M 50/249* (2021.01); *H01M 50/271* (2021.01); *H01M 50/543* (2021.01); *H01M 50/209* (2021.01); *H01M 50/55* (2021.01); *H01M 50/553* (2021.01); *H01M 2220/20* (2013.01)

(58) Field of Classification Search
  CPC ........... H01M 50/271; H01M 50/0431; H01M 50/209; H01M 50/55; H01M 50/553; H01M 2220/20
  See application file for complete search history.

(56) References Cited

U.S. PATENT DOCUMENTS

| | | | |
|---|---|---|---|
| 10,207,573 | B2 | 2/2019 | Hara |
| 2005/0242774 | A1 | 11/2005 | Marraffa |
| 2012/0028099 | A1 | 2/2012 | Aoki |
| 2014/0011056 | A1* | 1/2014 | Adachi ................ B60L 58/26 429/7 |
| 2016/0218388 | A1 | 7/2016 | Kim et al. |
| 2017/0012330 | A1 | 1/2017 | Kim et al. |
| 2017/0305249 | A1 | 10/2017 | Hara |
| 2018/0337374 | A1 | 11/2018 | Matecki et al. |
| 2019/0207174 | A1 | 7/2019 | Zhang et al. |
| 2020/0028201 | A1 | 1/2020 | Ahn |
| 2020/0152928 | A1 | 5/2020 | Cai et al. |
| 2020/0212525 | A1 | 7/2020 | Ogino |

FOREIGN PATENT DOCUMENTS

| | | | |
|---|---|---|---|
| CN | 202268412 U | 6/2012 | |
| CN | 202434596 U | 9/2012 | |
| CN | 204857805 U | 12/2015 | |
| CN | 105489810 A | 4/2016 | |
| CN | 205159401 U | 4/2016 | |
| CN | 105826492 A | 8/2016 | |
| CN | 205488244 U | 8/2016 | |
| CN | 106601958 A | 4/2017 | |
| CN | 206148486 U | 5/2017 | |
| CN | 107379949 A | 11/2017 | |
| CN | 206628518 U | 11/2017 | |
| CN | 107658401 A | 2/2018 | |
| CN | 207558892 U | 6/2018 | |
| CN | 108832039 A | 11/2018 | |
| CN | 109256511 A | 1/2019 | |
| CN | 208336326 U | 1/2019 | |
| CN | 209000986 U | 6/2019 | |
| CN | 209104243 U | 7/2019 | |
| CN | 209963117 U | 1/2020 | |
| CN | 209963118 U | 1/2020 | |
| CN | 111106279 A | 5/2020 | |
| CN | 111106282 A | 5/2020 | |
| DE | 102016212273 A1 | 1/2018 | |
| EP | 3506386 A1 | 7/2019 | |
| JP | 2012101663 A | 5/2012 | |
| JP | 2012123917 A | 6/2012 | |
| JP | 2015106531 A | 6/2015 | |
| JP | 2015115313 A | 6/2015 | |
| JP | 2016018729 A | 2/2016 | |
| JP | 2016081857 A | 5/2016 | |
| JP | 2016219262 A | 12/2016 | |
| JP | 201863913 A | 4/2018 | |
| WO | 2016185961 A1 | 11/2016 | |
| WO | 2018190498 A1 | 10/2018 | |
| WO | 2019026676 A1 | 2/2019 | |

OTHER PUBLICATIONS

Notice of Allowance of CN application No. 201910710351.4, dated Aug. 23, 2022.
First Office Action of CN application No. 201910710351.4, dated Jan. 29, 2021.
First Office Action of CN application No. 201910794640.7, dated Mar. 24, 2021.
Extended European Search Report of EP application No. 20166078.4, dated Nov. 27, 2020, 7 pages.
First Office Action of JP application No. 2019-157851, dated Sep. 1, 2020.
Second Office Action of JP application No. 2019-157851, dated May 11, 2021.
International Search Report of Application No. PCT/CN2020/097402, dated Sep. 16, 2020.
Written Opinion of International Search Authority for Application No. PCT/CN2020/097402, dated Sep. 16, 2020.
International Search Report of Application No. PCT/CN2020/091276, dated Aug. 21, 2020.
Written Opinion of International Search Authority for Application No. PCT/CN2020/091276, dated Aug. 21, 2020.

* cited by examiner

BATTERY PACK AND VEHICLE

CROSS-REFERENCE TO RELATED APPLICATIONS

This application is a continuation of U.S. patent application Ser. No. 16/856,883, filed on Apr. 23, 2020, which claims priority of Chinese Patent Application No. 201910565257.4, filed on Jun. 27, 2019. The disclosed contents of the aforementioned patent applications are hereby entirely incorporated into the present disclosure.

TECHNICAL FIELD

The present disclosure relates to the technical field of batteries, and, to a battery pack and a vehicle.

BACKGROUND

In recent years, rechargeable batteries have been widely used for providing power for high-power devices, such as electric vehicles and the like. The rechargeable batteries achieve greater capacity or power by connecting a plurality of battery units in series, in parallel or in series parallel.

SUMMARY

According to one aspect of the present disclosure, a battery pack is provided, including:
  a box assembly, including a box body and a fixed beam, wherein the fixed beam is fixed in the box body;
  a battery unit, arranged in the box body;
  a constraint component covering the battery unit and fixed with the fixed beam; and
  an outer cover arranged on one side of the constraint component away from the box body to seal an open end of the box body.

In some embodiments, the box body is divided into a plurality of accommodation cavities by the fixed beam, the battery pack includes a plurality of battery units, and the plurality of battery units are divided into several groups of battery units in a plane perpendicular to the height direction of the battery pack, and several groups of the battery units each has at least two battery units and are respectively arranged in different accommodation cavities.

In some embodiments, the box assembly includes a plurality of fixed beams arranged on both sides of each group of battery units along a grouping direction in which the battery units are divided into several groups.

In some embodiments, a plurality of battery units are divided into several groups along a length direction of the battery pack, the fixed beam extends along a width direction of the battery pack; and/or
  the plurality of battery units are divided into several groups along a width direction of the battery pack, and the fixed beam extends along a length direction of the battery pack.

In some embodiments, the battery pack includes a plurality of constraint components, and the constraint components respectively cover different groups of the battery units.

In some embodiments, the constraint component includes:
  a limiting portion covering the same group of battery units; and
  two mounting portions, respectively connected to the both sides of the limiting portion along a grouping direction of the battery units, wherein the two mounting portions are respectively fixed with the fixed beams on the both sides of the same groups of battery units.

In some embodiments, the whole limiting portion protrudes relative to the mounting portion toward a direction away from the battery units.

In some embodiments, there is only one fixed beam arranged between two adjacent groups of battery units, each of the two adjacent mounting portions fixed with the fixed beam includes a plurality of mounting blocks, the plurality of mounting blocks are arranged along an extension direction of the fixed beam at intervals, and the plurality of mounting blocks of the two adjacent mounting portions are alternately arranged.

In some embodiments, the constraint component is of a split structure covering at least part of the surface of the corresponding battery unit.

In some embodiments, there is a predetermined gap between an inner surface of the outer cover and an outer surface of the constraint component.

In some embodiments, the predetermined gap ranges from 2 mm to 100 mm.

In some embodiments, the battery pack further includes:
  a depression bar and a fastener, wherein the mounting portions are arranged between the depression bar and the fixed beam, and the fastener passes through the depression bar and the mounting portions and is fixed with the fixed beam to fix the mounting portions to the fixed beam.

In some embodiments, the battery pack further includes a sealing member, the sealing member is arranged between the outer cover and the box body to seal the open end of the box body.

In some embodiments, a bonding layer is arranged between the battery units on the bottommost layer and an inner bottom surface of the box body; and/or,
  a bonding layer is arranged between two adjacent battery units in each group of battery units; and/or
  a bonding layer is arranged between the constraint component and the battery unit on the topmost layer.

In some embodiments, the battery unit includes:
  a shell; and
  an electrode assembly arranged in the shell, wherein the electrode assembly includes a first pole piece, a second pole piece, and a diaphragm arranged between the first pole piece and the second pole piece; and
  wherein the electrode assembly is of a wound structure and is flat, the outer surface of the electrode assembly includes two flat surfaces, and the two flat surfaces are oppositely arranged along a height direction of the battery pack; or,
  the electrode assembly is of a laminated structure, and the first pole piece and the second pole piece are stacked along a height direction of the battery pack.

According to another aspect of the present disclosure, a vehicle is provided, including:
  the battery pack in the above embodiments; and
  a vehicle body provided with the battery pack.

BRIEF DESCRIPTION OF THE DRAWINGS

The drawings illustrated herein are used for providing a further understanding of the present disclosure and constitute a part of the present application, and the illustrative embodiments of the present disclosure and the descriptions thereof are used for explaining the present disclosure and do not constitute an undue limitation to the present disclosure. In the drawings.

Figure 1:
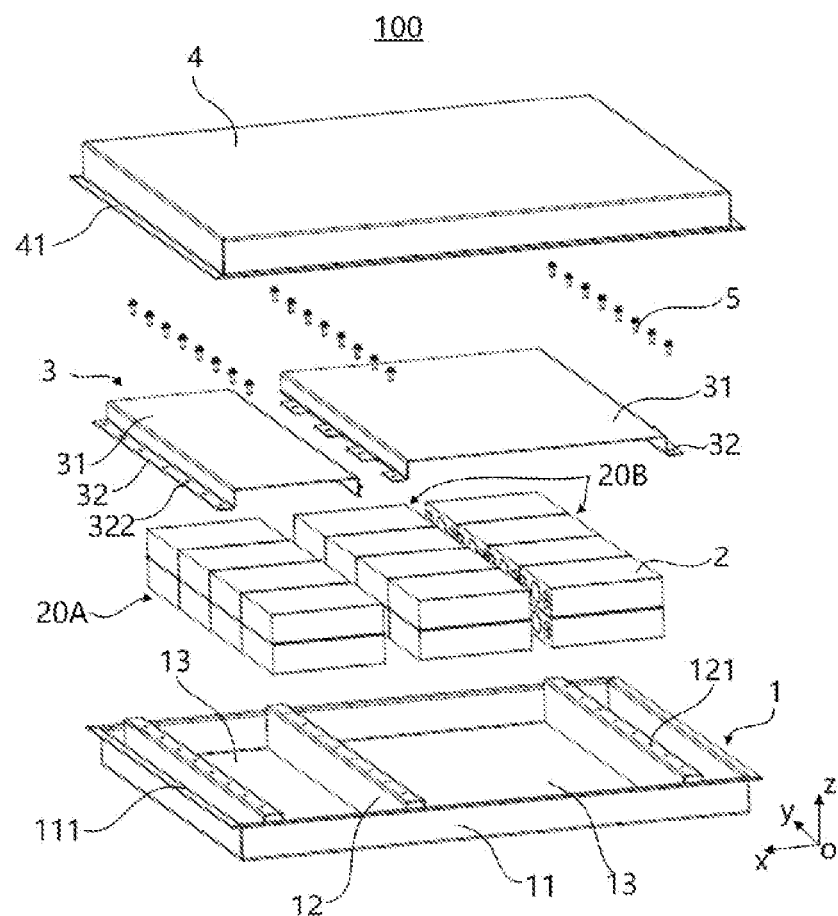
FIG. 1 is a decomposed schematic diagram of some embodiments of a battery pack of the present disclosure.

REFERENCE SIGNS 1, box assembly; 11, box body; 111, first flange; 12, fixed beam; 121, first mounting hole; 13, accommodation cavity;

2, battery unit; 20A, first group of battery units; 20B, second group of battery units; 21, shell; 22, electrode assembly; 221, first pole piece; 222, second pole piece; 223, diaphragm; 224, flat surface; 23, adapter piece; 24, cover plate assembly; 241, cover plate; 242, first electrode terminal; 243, second electrode terminal;

3, constraint component; 3A, first constraint component; 3B, second constraint component; 31, limiting portion; 32, mounting portion; 321, mounting block; 322, second mounting hole;

4, outer cover; 41, second flange;

5, fastener; 6, depression bar; 7, sealing member.

DETAILED DESCRIPTION

The present disclosure is described in detail below. In the following paragraphs, different aspects of the embodiments are defined in more detail. Aspects so defined can be combined with any other one or more aspects, unless clearly indicated that they are not combinable. In particular, any feature that is considered to be preferred or advantageous can be combined with the other one or more features that are considered to be preferred or advantageous.

The terms "first", "second" and the like appearing in the present disclosure are merely for the convenience of description to distinguish different components having the same name, and do not indicate a sequential or primary and secondary relationship.

In addition, when an element is referred to as being "on" another element, the element can be directly on the other element, or can be indirectly on the other element and one or more intermediate elements are inserted therebetween. In addition, when an element is referred to be "connected to" another element, the element can be directly connected to the other element or can be indirectly connected to the other element and one or more intermediate elements are inserted therebetween. The same reference sign denotes the same element below.

"A plurality of" appearing in the present disclosure refer to two or more (including two), and similarly, "multiple groups" refer to two or more groups (including two groups), and "multiple" refers to two or more (including two).

In order to clearly describe various orientations in the following embodiments, for example, various directions of a battery pack are defined in a coordinate system in FIG. 1, an x direction represents a length direction of the battery pack; a y direction is perpendicular to the x direction in the horizontal plane, and represents the width direction of the battery pack; the z direction is perpendicular to a plane formed by the x and y directions, and represents the height direction of the battery pack, when the battery pack is installed on a vehicle, the height direction of the battery pack is parallel to the vertical direction, and the vertical direction mentioned herein allows a certain angular deviation relative to the theoretical vertical direction. Based on this orientation definition, "upper", "lower", "top" and "bottom" are relative to the height direction.

In some embodiments, the present disclosure provides a vehicle including a vehicle body and a battery pack, and the battery pack is arranged in the vehicle body. The vehicle is a new energy vehicle, which can be a pure electric vehicle and can also be a hybrid vehicle or an extended-range vehicle, a driving motor is arranged in the vehicle body, the driving motor is electrically connected with the battery pack and is powered by the battery pack, and the driving motor is connected with wheels on the vehicle via a transmission mechanism so as to drive the vehicle to move. For example, the battery pack can be horizontally arranged at the bottom of the vehicle body and can be mounted in a top hooking and/or a bottom supporting manner.

In an actual use process, it is found that an outer cover of a battery pack has a large area and relatively poor rigidity, and a battery unit expands during charging and discharging, so that the outer cover of the battery pack is greatly deformed. The deformation of the outer cover of the battery pack will reduce the sealing performance of the outer cover and a box body, so that the external moisture enters the battery pack to cause a short circuit problem; and since the outer cover of the battery pack may jack the other components of a vehicle after deformation, when the battery pack needs to be removed from the vehicle for maintenance, it is difficult to be removed from the vehicle and reinstall on the vehicle.

Embodiments of the present disclosure provide a battery pack and a vehicle, which can effectively improve the sealing property of the battery pack.

Based on the above technical solutions, in the battery pack according to some embodiments of the present disclosure, by disposing the constraint component and fixing the same with the fixed beam, when the battery unit expands, a stable and effective pressing force can be provided for the battery unit to reduce the degree of expansion deformation of the battery unit; and moreover, since the constraint component is provided, the deformation of the outer cover can be reduced, and the sealing property of the battery pack can be improved.

FIG. 1 to FIG. 5 are structural schematic diagrams of one embodiment of a battery pack of the present disclosure. The battery pack 100 includes a box assembly 1, a battery unit 2, a constraint component 3, and an outer cover 4.

The box assembly 1 includes a box body 11 and a fixed beam 12, the box body 11 has an open end, the fixed beam 12 is fixed in the box body 11, for example, the fixed beam 12 can be fixed to an inner bottom surface or a side wall of the box body 11. The battery unit 2 is arranged in the box body 11, the constraint component 3 covers the battery unit 2 and be in contact with the battery unit 2 on the topmost layer or reserve a predetermined gap, and the constraint component 3 is fixed with the fixed beam 12, and is configured to limit the expansion of the battery unit 2.

The outer cover 4 is arranged on one side of the constraint component 3 away from the box body 11, and is buckled to the open end of the box body 11 along the height direction of the battery pack for sealing the open end of the box body 11. The sealing here refers to a sealing connection between the outer cover 4 and the box body 11, which can prevent external liquid and water vapor from entering the battery pack, thereby improving the safety performance of the battery pack.

In the embodiment of the present disclosure, by disposing the constraint component 3 and fixing the same with the fixed beam 12, when the battery unit 2 expands, a stable and effective pressing force can be provided for the battery unit 2 to reduce the degree of expansion deformation of the battery unit 2; and moreover, since the constraint component 3 is provided, the deformation of the outer cover 4 can be reduced, and the sealing property of the battery pack can be improved. Furthermore, since the battery pack is provided with the constraint component 3, the deformation of the outer cover 4 can be reduced, when the battery pack is applied to the vehicle, the battery pack can still be smoothly removed or installed at the original mounting position after long-term use, so that the maintenance difficulty of the battery pack can be reduced, and the situation that an external force applied to a mounting structure member on the vehicle due to the deformation of the battery pack can also be prevented.

As shown in FIG. 1, the box body 11 is divided into a plurality of accommodation cavities 13 by the fixed beam 12, the battery pack includes a plurality of battery units 2, and the plurality of battery units 2 are divided into several groups of battery units in a plane perpendicular to the height direction, and several groups of the battery units 2 each has at least two battery units 2 and are respectively arranged in different accommodation cavities 13. For example, the sizes of the accommodation cavities 13 are adapted to the overall outline size of the battery units 2 in the same group.

In the present embodiment, the battery units 2 are divided into several groups, and the constraint component 3 is fixed with the fixed beams 12 for grouping the battery units 2, the fixing points between the constraint component 3 and the box body 11 are increased, therefore, the span between the fixing points is reduced, and the deformation resistance of the constraint component 3 can be improved. Compared with the conventional solution of constraining the entirety of all battery units through a cover body, the present embodiment has the advantages that fixed constraint is separately applied to the periphery of each group of battery units 2, when the battery units expand, the constraint component 3 is not easy to be deformed, a stable pressing force can be further provided for the battery units 2 to prevent an increase in the size of the battery pack on the height direction, and it is also not easy to squeeze the outer cover 4 due to the deformation of the constraint component 3, thereby prolonging the service life of the battery pack.

Moreover, the battery units 2 are divided into several groups, when part of the battery units 2 work to generate a large amount of heat leading to thermal runaway, the diffusion of the heat toward the battery units 2 of other groups can be relieved, thereby improving the working safety of the battery pack, even if a part of the battery units 2 cannot be used normally, the battery pack can be used with reduced power.

As shown in FIG. 1, the battery pack includes a plurality of fixed beams 12, and the fixed beams 12 are arranged on both sides of each group of battery units 2 along a grouping direction in which the battery units 2 are divided into several groups. The fixed beams 12 are arranged not only in a passage formed by the adjacent groups of battery units 2, but also on one side of the battery units 2 in the outermost group close to the inner wall of the box body 11. The fixed beam 12 can be designed into a continuous structure on its own extension direction and can also be designed into a segmented structure.

The groups of battery units 2 can be fixed on the both sides along the grouping direction in the structure, in order to apply a more stable constraint force to the battery units 2, thereby improving the constraint effect on the group of battery units 2, and the expansion of the battery units can be further limited to prolong the service life of the battery pack.

For example, one layer or multiple layers of battery units 2 are stacked along the height direction, for example, two layers are provided in FIG. 1. The battery units 2 are divided into a plurality of columns along the grouping direction, and the battery units 2 in each column of battery units 2 are connected in parallel or in series through a bus bar, for two adjacent column of battery units 2 with electrode terminals facing each other, a gap is disposed between two adjacent columns of battery units 2.

For example, the distance between adjacent fixed beams 12 is configured to accommodate two columns of battery units 2 at most. In this way, the span between the adjacent fixed beams 12 can be reduced as much as possible, more fixing points are available between the constraint components 3 and the fixed beams 12, the deformation resistance of the constraint component 3 can be improved, and the constraint reliability on each group of battery units 2 can be improved.

Figure 2:
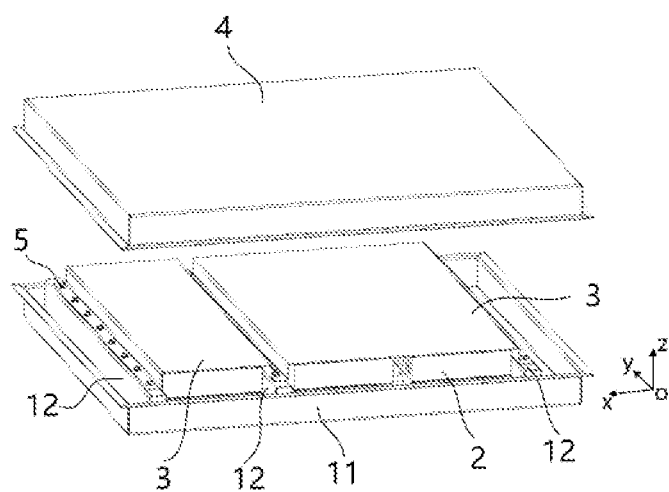
FIG. 2 is a structural schematic diagram of the battery pack as shown in FIG. 1 after an outer cover is opened.

In a front view as shown in FIG. 2, three fixed beams 12 extending along the width direction of the battery pack are arranged in the box body 11, and can be fixed to the inner bottom surface of the box body 11, the intermediate fixed beam 12 is located between two groups of battery units 2, the fixed beams 12 on both sides are arranged in the vicinity of the inner side wall of the box body 11, the space inside the box body 11 is divided into two accommodation cavities 13, wherein the first group of battery units 20A is placed in one accommodation cavity 13 (located on the left side in FIG. 1), and the first group of battery units 20A includes only one column of battery units 2; the second group of battery units 20B is placed in the other accommodation cavity 13 (located on the right side in FIG. 1), and the second group of battery units 20B includes two columns of battery units 2 arranged side by side along the length direction at intervals. Each column of battery units 2 includes a plurality of battery units 2 arranged side by side along the width direction in sequence, the side faces of the two adjacent battery units 2 are in contact with each other, and two layers of battery units 2 are stacked on the height direction.

The extension direction of the fixed beams 12 is perpendicular to the grouping direction of the battery units 2, so that the internal structure of the battery pack more compact. As shown in FIG. 1, a plurality of battery units 2 are grouped along the length direction of the battery pack, the fixed beams 12 extend along the width direction of the battery pack, this arrangement mode is conducive to dividing the battery units 2 into more groups to increase the fixing points between the constraint component 3 and the box body 11, and the overall length-width ratio of each group of battery units 2 can be reduced, so that the constraint rigidity of the constraint component 3 on each group of battery units 2 on the length and width directions is balanced, and the constraint reliability is improved.

Optionally, a plurality of battery units 2 are divided into several groups along the width direction of the battery pack, and the fixed beams 12 extend along the length direction of the battery pack. Or the plurality of battery units 2 can also be divided into several groups simultaneously along the length direction and the width direction of the battery pack, and the fixed beams 12 forms a latticed structure.

For the specific structure of the fixed beam 12, a solid fixed beam or a hollow fixed beam can be used, and the cross section thereof can be rectangular, trapezoidal or C-shaped or the like, the upper surface thereof can be set as a plane to fix the constraint component to the upper surface of the fixed beam 12, and optionally, the constraint component 3 can also be fixed to the side face of the fixed beam 12.

Figure 8:
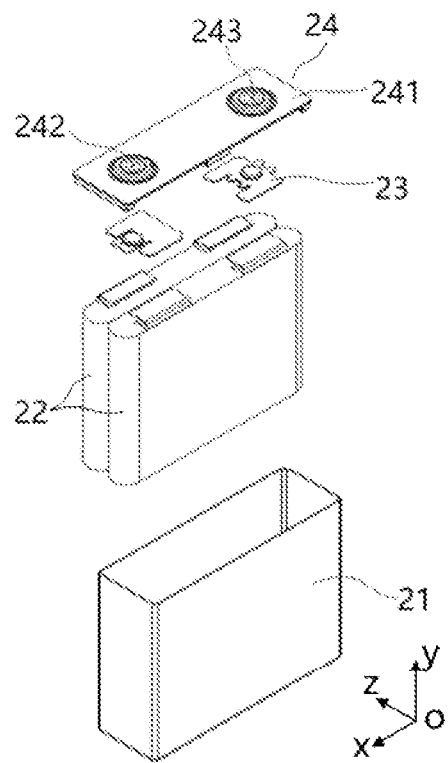
FIG. 8 is a decomposed schematic diagram of some embodiments of a battery unit in the battery pack.

In the decomposed schematic diagram as shown in FIG. 8, each battery unit 2 includes: a shell 21 and an electrode assembly 22 arranged in the shell 21, and the shell 21 can have a hexahedral shape or other shapes and has an opening. The electrode assembly 22 is accommodated in the shell 21. A cover plate assembly 24 covers the opening of the shell 21. The cover plate assembly 24 includes a cover plate 241 and two electrode terminals arranged on the cover plate, and the two electrode terminals are respectively a first electrode terminal 242 and a second electrode terminal 243. The first electrode terminal 242 can be a positive electrode terminal, and the second electrode terminal 243 can be a negative electrode terminal. In other embodiments, the first electrode terminal 242 can also be a negative electrode terminal, and the second electrode terminal 243 is a positive electrode terminal. An adapter piece 23 is arranged between the cover plate assembly 24 and the electrode assembly 22, and the lugs of the electrode assembly 22 are electrically connected with the electrode terminals on the cover plate 241 through the adapter piece 23. In the present embodiment, two adapter pieces 23 are disposed, namely, a positive electrode adapter piece and a negative electrode adapter piece, respectively.

As shown in FIG. 8, two electrode assemblies 22 are arranged in the shell 21, and the two electrode assemblies 22 are stacked along the height direction (the z direction) of the battery unit 2, wherein the height direction of the battery unit 2 is consistent with the height direction of the battery pack. Of course, in other embodiments, only one electrode assembly 22 is arranged in the shell 21, or three or more electrode assemblies 22 are arranged in the shell 21. A plurality of electrode assemblies 22 are stacked along the height direction (the z direction) of the battery unit 2.

Figure 9:
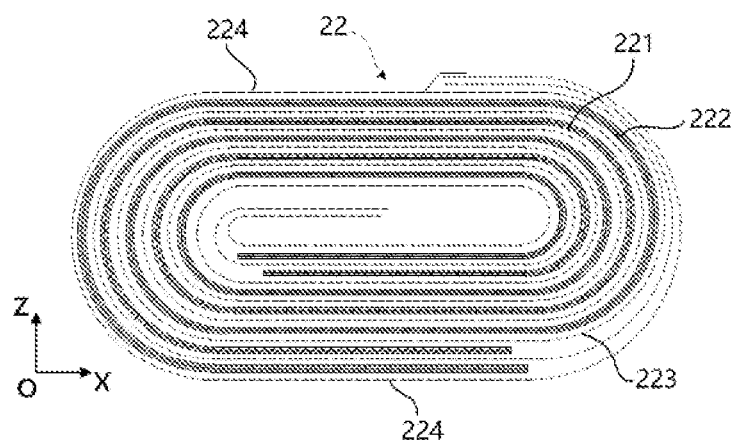
FIG. 9 is a section view of a wound electrode assembly of the battery pack along the xz plane in FIG. 8.
Figure 10:
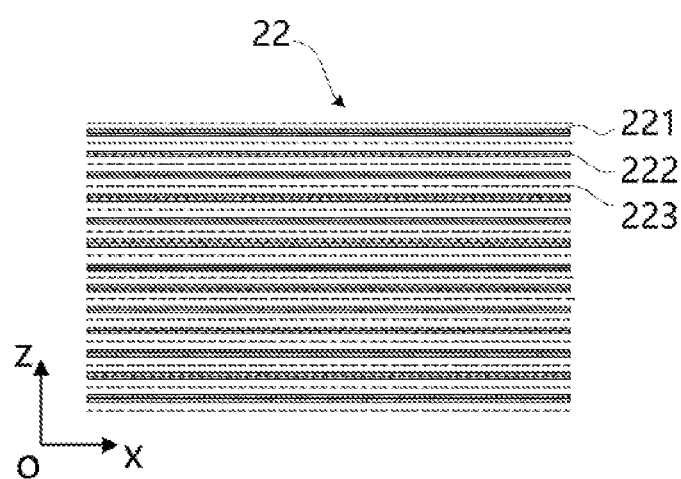
FIG. 10 is a section view of a stacked electrode assembly of the battery pack along the xz plane in FIG. 8.

As shown in FIG. 9 and FIG. 10, the electrode assembly 22 includes a first pole piece 221, a second pole piece 222, and a diaphragm 223 arranged between the first pole piece 221 and the second pole piece 222. The first pole piece 221 can be a positive pole piece, and the second pole piece 222 is a negative pole piece. In other embodiments, the first pole piece 221 can also be a negative pole piece, and the second pole piece 222 is a positive pole piece. The diaphragm 223 is an insulator located between the first pole piece 221 and the second pole piece 222. The active substance of the positive pole piece can be coated on a coating area of the positive pole piece, and the active substance of the negative pole piece can be coated on the coating area of the negative pole piece. A portion extending from the coating area of the positive pole piece serves as a positive electrode lug; and a portion extending from the coating area of the negative pole piece serves as a negative electrode lug. The positive electrode lug is connected to the positive electrode terminal on the cover plate assembly 24 through the positive electrode adapter piece, and likewise, the negative electrode lug is connected to the negative electrode terminal on the cover plate assembly 24 through the negative electrode adapter piece.

As shown in FIG. 9, the electrode assembly 22 is of a wound structure. The first pole piece 221, the diaphragm 223 and the second pole piece 222 are all of strip-shaped structure, the first pole piece 221, the diaphragm 223 and the second pole piece 222 are sequentially stacked and wound for two or more circles to form the electrode assembly 22, and the electrode assembly 22 is flat. When the electrode assembly 22 is fabricated, the electrode assembly 22 can be directly wound into a flat shape, or can be wound into a hollow cylindrical structure at first and then is flattened after being wound. FIG. 9 is a schematic diagram showing the outline of the electrode assembly 22, the outer surface of the electrode assembly 22 includes two flat surfaces 224, and the two flat surfaces 224 are oppositely arranged along the height direction (the z direction) of the battery unit 2. The electrode assembly 22 is substantially of a hexahedral structure, and the flat surface 224 is substantially parallel to the winding axis and is the largest outer surface. The flat surface 224 can be a relatively flat surface and is not required to be a strict plane.

As shown in FIG. 10, the electrode assembly 22 is of a laminated structure, that is, the electrode assembly 22 includes a plurality of first pole pieces 221 and a plurality of second pole pieces 222, and the diaphragms 223 are arranged between the first pole pieces 221 and the second pole pieces 222. The first pole pieces 221 and the second pole pieces 222 are stacked along the height direction (the z direction) of the battery unit 2.

The electrode assembly 22 inevitably expands along the thickness direction of the pole pieces during charging and discharging, the amount of expansion of each pole piece is superimposed, the amount of expansion accumulated on the height direction is larger than that of the other directions, in the embodiment of the present disclosure, by increasing the fixing points between the constraint member 3 and the box body 11, the direction having the maximal amount of expansion of the battery unit 2 can be constrained to prevent the deformation of the battery pack, thereby prolonging the service life of the battery pack.

Figure 3:
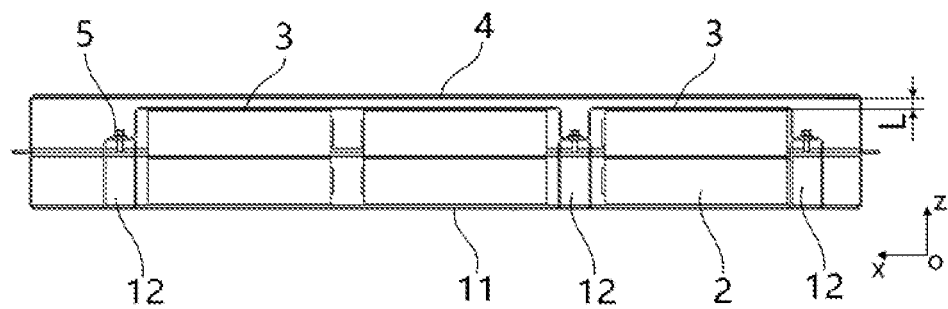
FIG. 3 is a section view of the battery pack as shown in FIG. 1 along an xz plane.

As shown in FIG. 3, there is a predetermined gap L between an inner surface of the outer cover 4 and an outer surface of the constraint component 3. By reserving an expansion space for the battery units 2, a force generated after the deformation of the constraint component 3 can be prevented from being transmitted to the outer cover 4 to force the outer cover 4 to generation deformation as well; furthermore, even if the battery unit 2 expands, such that the constraint component 3 is deformed to contact with the top cover 4, the outer cover 4 can further constrain the deformation of the constraint component 3 and the expansion of the battery unit 2. For example, for different sizes of battery packs, the predetermined gap ranges from 2 mm to 100 mm.

As shown in FIG. 1 and FIG. 2, the battery pack can include a plurality of constraint components 3, and the constraint components 3 respectively cover different groups of battery units 2. In the present embodiment, by using a plurality of constraint components 3 to respectively constrain different groups of battery units 2, fixed constraint can be independently applied to each group of battery units 2, thereby reducing the covering surface of the constraint component 3, and improving the self-stiffness to prevent easy deformation, so as to provide a stable and reliable constraint force. Furthermore, when the expansion of a certain group of battery units 2 is greater, which results in deformation of the same constraint component 3, the influence on the other groups of battery units 2 can be avoided, and the working reliability and the service life of the battery pack can be improved.

Specifically, each constraint component 3 includes a limiting portion 31 and two mounting portions 32. Wherein the limiting portion 31 covers the same group of battery units 2. The two mounting portions 32 are respectively connected to the both sides of the limiting portion 31 along the grouping direction of the battery units 2 and are respectively fixed with the fixed beams 12 on both sides of the same group of battery units 2 along the grouping direction. The constraint component 3 can be formed by bending a flat plate.

As shown in FIG. 2, the limiting portion 31 completely covers the top faces of the same group of battery units 2, so that the constraint force on the battery units 2 can be improved, and the deformation resistance of the constraint component 3 can be enhanced.

In the embodiment, by providing a plurality of independent constraint components 3, the groups of battery units 2 can be respectively constrained, the constraints on each groups of battery units 2 are completely independent, and the disassembly and assembly of the respective constraint components 3 does not affect each other. When the groups of battery units 2 have different heights, the mounting of the constraint components 3 is not affected. If the amount of expansion in an individual group of battery units 2 is relatively large, only the corresponding constraint component 3 is deformed, and the deformation force is not transmitted to the other constraint components 3. Moreover, when the individual group of battery units 2 is faulty and needs to be maintained and replaced by opening the cover, only the corresponding constraint component 3 needs to be operated without disassembling the other constraint components 3.

As shown in FIG. 3, the whole limiting portion 31 protrudes relative to the mounting portion 32 toward a direction away from the battery units 2. Such a structure can not only reduce the arrangement height of the fixed beam 12 but also ensure the strength of the fixed beam 12, and when the mounting portion 32 and the fixed beam 12 are fixed by using a fastener 5, the fastener 5 can be prevented from protruding from the top face of the limiting portion 31, and the height of the battery pack can be reduced.

Figure 4:
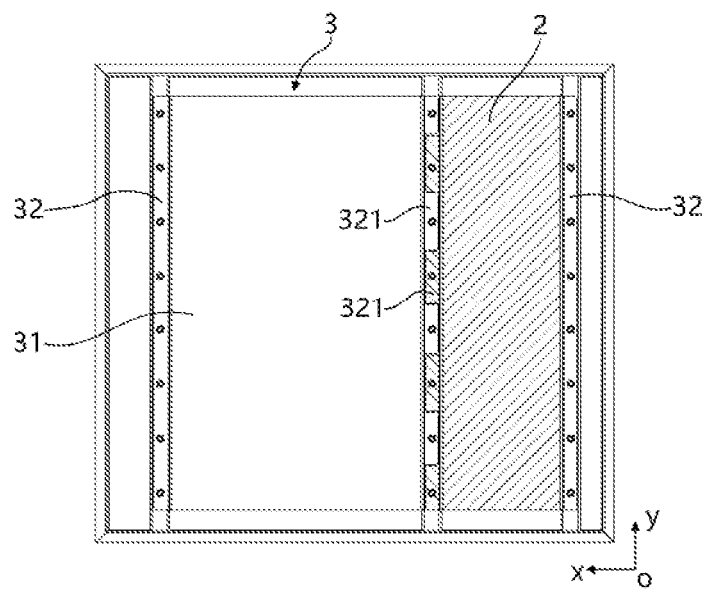
FIG. 4 is a partial section view of an internal structure of the battery pack as shown in FIG. 2.

As shown in FIG. 3 and FIG. 4, there is only one fixed beam 12 arranged between two adjacent groups of battery units 2, each of the two adjacent mounting portions 32 fixed with the fixed beam 12 includes a plurality of mounting blocks 321, the plurality of mounting blocks 321 are arranged along the extension direction of the fixed beam 12 at intervals, and the plurality of mounting blocks 321 of the two adjacent mounting portions 32 are alternately arranged. For example, the mounting block 321 can have a rectangular, trapezoidal or triangular configuration. The structure can make the constraint components 3 corresponding to the two adjacent groups of battery units 2 to be fixed by one fixed beam 12, therefore the space can be saved, and the energy density of the battery pack can be improved. Optionally, two fixed beams 12 are arranged between the two adjacent groups of battery units 2, and two constraint components 3 are respectively fixed on two fixed beams 12.

Specifically, as shown in FIG. 1, in order to fix the outer cover 4 with the box body 11, a first flange 111 is arranged around the open end of the box body 11, a second flange 41 is arranged around the outer cover 4, and the first flange 111 and the second flange 41 can be fixed by bonding or fastener connection. In order to fix the constraint component 3 with the fixed beam 12, the mounting portion 32 is provided with a plurality of second mounting holes 322 spaced apart along the extension direction of the fixed beam 12, the top of the fixed beam 12 is provided with a plurality of first mounting holes 121 spaced apart along its own extension direction, and the fastener 5 passes through the second mounting holes 322 and the first mounting holes 121 to fix the constraint component 3 with the fixed beam 12.

Figure 5:
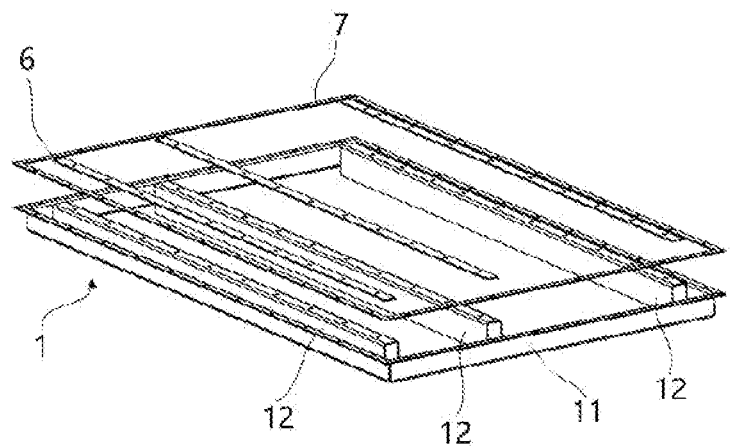
FIG. 5 is a structural schematic diagram of the battery pack provided with a depression bar and a sealing member.

As shown in FIG. 5, the battery pack of the present disclosure can further include: a depression bar 6 arranged between the mounting portion 32 and the fixed beam 12, the depression bar 6 can adopt a long strip-like structure, and the depression bar 6 is provided with a hole for ensuring the fastener 5 to pass through. The depression bar 6 with a proper thickness can be selected during the assembly to adjust the assembly gap, after the constraint component 3 and the fixed beam 12 are fixed by the fastener 5, a proper assembly gap can be kept between the constraint component 3 and the battery unit 2, so as to prevent the constraint component 3 from generating a larger pressing force on the battery unit 2, thereby prolonging the service life of the battery pack.

Optionally, the depression bar 6 can also be arranged between the fastener 5 and the top face of the mounting portion 32. For example, when the fastener 5 is a screw, the depression bar 6 is arranged between the screw head and the top face of the mounting portion 32 to improve the fixing reliability of the fastener 5.

Still referring to FIG. 5, in order to ensure the sealing property of an internal space of the battery pack, and to prevent the external liquid or water vapor from entering the battery pack to affect the working performance of the battery unit 2, the battery pack of the present disclosure can further include a sealing member 7 arranged between the outer cover 4 and the box body 11, and the sealing member 7 can have a long strip-like structure or a rectangular annular structure. The sealing member 7 is provided with a hole for ensuring the fastener 5 to pass through. The sealing member can be made of silicone rubber or other materials. When the battery pack is used in a vehicle, the sealing member can also absorb vibration transmitted to the battery pack during the work of the vehicle.

In some embodiments, in order to improve the fixing reliability of the battery unit 2 and to prevent the battery unit 2 from shaking, a bonding layer is arranged between the battery unit 2 on the bottommost layer and an inner bottom surface of the box body 11; and/or, a bonding layer is arranged between two adjacent battery units 2 in each group of battery units 2; and/or, a bonding layer is arranged between the constraint component 3 and the battery unit 2 on the topmost layer. For the battery pack provided with only a single layer of battery unit 2, the battery unit 2 on the bottommost layer and the battery unit 2 on the topmost layer are the same layer of battery unit 2.

Figure 6:
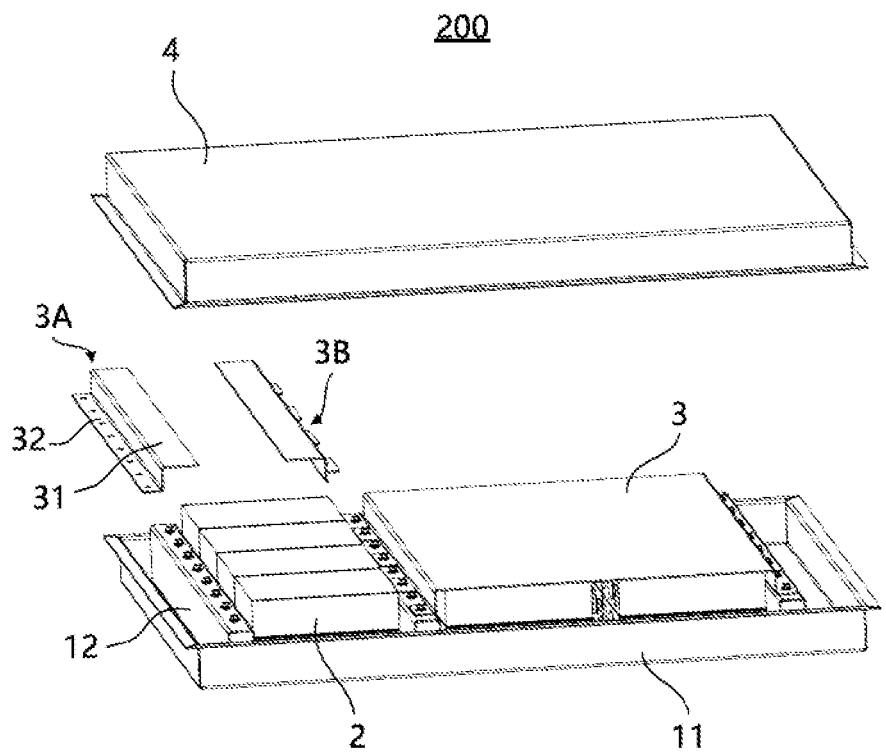
FIG. 6 is a decomposed schematic diagram of other embodiments of the battery pack of the present disclosure.
Figure 7:
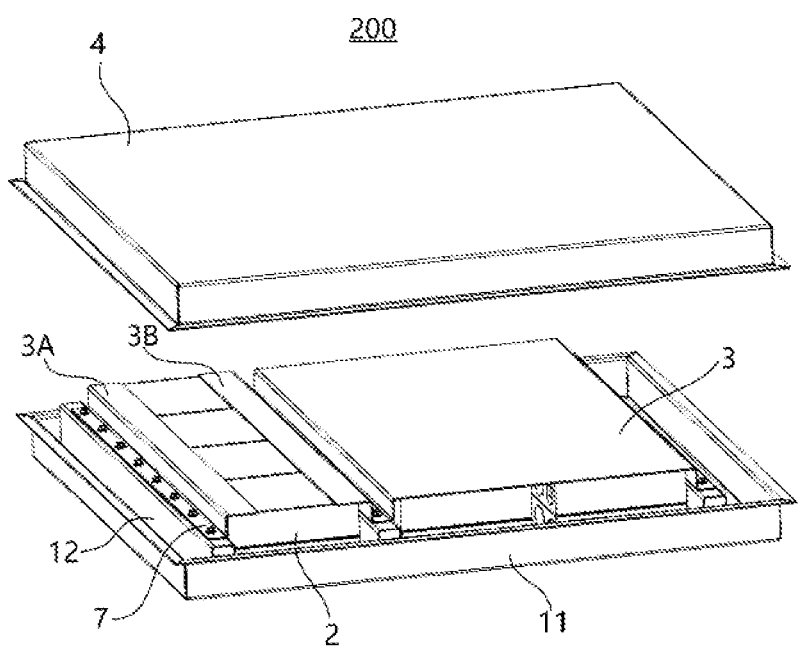
FIG. 7 is a structural schematic diagram of the battery pack as shown in FIG. 6 after the outer cover is opened.

FIG. 6 and FIG. 7 are structural schematic diagram of other embodiments of a battery pack of the present disclosure. The difference between the battery pack 200 and the battery pack 100 shown in FIG. 1 to FIG. 4 lies in that the constraint component 3 can adopt a split structure and cover part of surfaces of the battery unit 2.

The constraint component 3 is of a split structure and arranged at least along one of the length direction and the width direction, the constraint component 3 adopts a split structure and covers at least part of the surface of the corresponding battery unit 2. As shown in FIG. 6, the constraint component 3 for covering the first group of battery units 20A includes a first constraint component 3A and a second constraint component 3B, and the limiting portions 31 of the first constraint component 3A and the second constraint component 3B can be arranged along the length direction at intervals and only cover part of the surfaces of the group of battery units 2. The mounting portion 32 of the first constraint component 3A continuously extends along the width direction, and the mounting portion 32 of the second constraint component 3B includes a plurality of mounting blocks 321 arranged along the width direction at intervals. The constraint component 3 for covering the second group of battery units 20B adopts an integral structure. FIG. 7 shows a schematic diagram of fixing the first constraint component 3A and the second constraint component 3B to the fixed beam 12 by the fastener 5.

The embodiment has the advantages that, due to the influence of the dimensional tolerance of the battery units 2 and the accuracy of the stacking arrangement, the tops of the battery units 2 in the same group may have a height difference, the split constraint component 3 is used to reduce the processing requirements for the height size of a side plate of the limiting portion, and the assembly is also easy; furthermore, the split constraint component 3 can save the material; and in addition, the heat dissipation of the battery unit 2 is facilitated by partially covering the surfaces of the battery units 2.

On this basis, the temperature adjustment can be performed according to the working requirements of the battery pack, and the box assembly 1 can further include a temperature control component, the temperature control component is arranged in a bottom area of the box body 11, the temperature control component is used for performing temperature adjustment on the battery unit 2 from the bottom, for example, in order to take away the heat generated in the working process of the battery unit 2, the battery unit 2 can be cooled; or when the battery pack is used in a low temperature area, the battery unit can be heated.

In the embodiments of the present disclosure, by disposing the heat-conducting fixed beam 12 and the constraint component 3, and covering the tops and the sides of the groups of battery units 2, when the temperature control component performs the temperature adjustment at the bottom of the box body 11, the temperature can be sequentially transmitted to the fixed beam 12 and the constraint component 3, therefore the conduction path of the temperature control component to regulate the temperature of the battery unit 2 is changed, the temperature distribution in the accommodation cavity along the height direction can be balanced, the temperature difference between the battery units 2 in the upper and lower areas can be reduced, and the temperature uniformity of the battery units 2 is improved, thereby improving the consistency of discharging depths.

In some embodiments, a device using a secondary battery is also provided in the present disclosure, and the battery includes the battery pack of the above embodiments. The device using secondary battery can include vehicle, ship, drone, etc. Since the sealing property of the battery pack can be improved, the battery pack can still be smoothly removed or installed at the original mounting position after long-term use, so that the maintenance difficulty of the battery pack can be reduced, and the situation that an external force applied to a mounting structure member on the device due to the deformation of the battery pack can also be prevented.

The battery pack and the vehicle provided by the present disclosure are described in detail above. The principles and the embodiments of the present disclosure have been described herein by using specific embodiments, and the description of the above embodiments is only used for assisting to understand the method of the present disclosure and its core idea. It should be noted that those of ordinary skill in the art can make several improvements and modifications to the present disclosure without departing from the principles of the present disclosure, and these improvements and modifications shall also fall within the protection scope of the claims of the present disclosure.

What is claimed is:

1. A battery pack, comprising:
    a box assembly; and
    a plurality of battery units arranged in the box assembly, wherein the battery units are divided into a plurality of battery unit groups;
    wherein the box assembly comprises:
        a box body; and
        a plurality of fixed beams arranged in parallel in the box body, wherein one or more battery unit groups are placed between two fixed beams;
        a plurality of constraint components, wherein each constrain component covers the one or more battery unit groups placed between the two fixed beams, and is attached to the two fixed beams; and
        an outer cover attached to the box body, covering the constraint components;
    wherein each battery unit comprises:
        a shell; and
        an electrode assembly arranged in the shell;
    wherein the electrode assembly comprises a first pole piece, a second pole piece, and a diaphragm arranged between the first pole piece and the second ole piece; and
    wherein
        the electrode assembly is of a wound structure and is flat, the outer surface of the electrode assembly comprises two flat surfaces, and the two flat surfaces are oppositely arranged along a height direction of the battery pack; or
        the electrode assembly is of a laminated structure, and the first pole piece and the second pole piece are stacked along a height direction of the battery pack.

2. The battery pack according to claim 1, wherein each of the battery unit groups has at least two battery units.

3. The battery pack according to claim 1, wherein the plurality of battery units are divided into several battery unit groups along a length direction of the battery pack, and the fixed beam extends along a width direction of the battery pack.

4. The battery pack according to claim 1, wherein the plurality of battery units are divided into several battery unit groups along a width direction of the battery pack, and the fixed beam extends along a length direction of the battery pack.

5. The battery pack according to claim 1, wherein the constraint components respectively cover different groups of the battery units.

6. The battery pack according to claim 5, wherein each constraint component comprises:
    a limiting portion covering the same group of battery units; and
    two mounting portions, respectively connected to the both sides of the limiting portion along a grouping direction of the battery units,
wherein the two mounting portions are respectively fixed with the fixed beams on the both sides of the same group of battery units.

7. The battery pack according to claim 6, wherein the limiting portion protrudes relative to the mounting portion toward a direction away from the battery units.

8. The battery pack according to claim 6, wherein there is only one fixed beam arranged between two adjacent groups of battery units, each of the two adjacent mounting portions fixed with the fixed beam comprises a plurality of mounting blocks, the plurality of mounting blocks are arranged along an extension direction of the fixed beam at intervals, and the plurality of mounting blocks of the two adjacent mounting portions are alternately arranged.

9. The battery pack according to claim 1, wherein at least one constraint component is of a split structure covering at least part of the surface of the corresponding battery units.

10. The battery pack according to claim 1, wherein there is a gap between an inner surface of the outer cover and an outer surface of the constraint components.

11. The battery pack according to claim 10, wherein the gap ranges from 2 mm to 100 mm.

12. The battery pack according to claim 6, wherein the box assembly further comprises:

a depression bar and a fastener, wherein the mounting portions are arranged between the depression bar and the fixed beam, and the fastener passes through the depression bar and the mounting portions, and is fixed with the fixed beam to fix the mounting portions to the fixed beam.

13. The battery pack according to claim 1, further comprising a sealing member, wherein the sealing member is arranged between the outer cover and the box body to seal the open end of the box body.

14. The battery pack according to claim 1, wherein a bonding layer is arranged between the battery units on the bottommost layer and an inner bottom surface of the box body.

15. The battery pack according to claim 1, wherein a bonding layer is arranged between two adjacent battery units in each group of battery units.

16. The battery pack according to claim 1, wherein a bonding layer is arranged between the constraint component and the battery units on the topmost layer.

17. A vehicle, comprising:
the battery pack according to claim 1; and
a vehicle body provided with the battery pack.

18. A device powered by a secondary battery, wherein the secondary battery comprises the battery pack according to claim 1.

* * * * *